(12) United States Patent
Matsumura

(10) Patent No.: US 6,314,241 B1
(45) Date of Patent: *Nov. 6, 2001

(54) CAMERA

(75) Inventor: Koichi Matsumura, Kanagawa (JP)

(73) Assignee: Canon Kabushiki Kaisha ( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/887,564

(22) Filed: Jul. 3, 1997

Related U.S. Application Data

(63) Continuation of application No. 08/556,858, filed on Nov. 2, 1995, now abandoned.

(30) Foreign Application Priority Data

Nov. 15, 1994 (JP) .................................................. 6-280904

(51) Int. Cl.[7] .............................. G03B 7/28; G03B 7/099; G03B 15/03
(52) U.S. Cl. .......................... 396/120; 396/155; 396/234; 396/268
(58) Field of Search ................................... 396/61, 65, 98, 396/129, 45, 227, 234, 233, 155, 268, 165

(56) References Cited

U.S. PATENT DOCUMENTS

| 2,058,086 | * | 10/1936 | Kuppenbender | 354/476 |
| 4,847,680 | * | 7/1989 | Okino | 354/430 |
| 4,908,646 | * | 3/1990 | Sato et al. | 354/432 |
| 5,023,649 | * | 6/1991 | Hayashi et al. | 354/476 |
| 5,111,232 | * | 5/1992 | Tsunefuji | 354/402 |
| 5,266,990 | * | 11/1993 | Sakamoto et al. | 354/149.1 |
| 5,311,240 | * | 5/1994 | Wheeler | 354/402 |
| 5,440,369 | * | 8/1995 | Tabata et al. | 354/432 |
| 5,483,320 | * | 1/1996 | Aoki et al. | 354/475 |

* cited by examiner

Primary Examiner—Christopher E. Mahoney
(74) Attorney, Agent, or Firm—Robin, Blecker & Daley

(57) ABSTRACT

A camera having a function of detecting the direction and intensity of a light source such as the sun is arranged to prevent a shadow from appearing by emitting a flash light when the result of detection indicates a condition under which a shadow is expected to appear at an object of shooting.

7 Claims, 13 Drawing Sheets

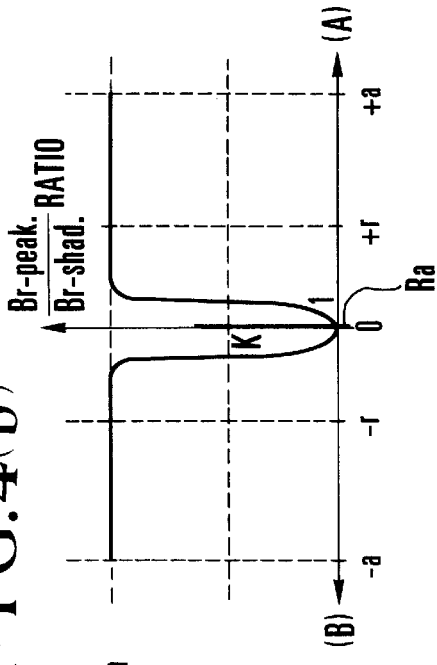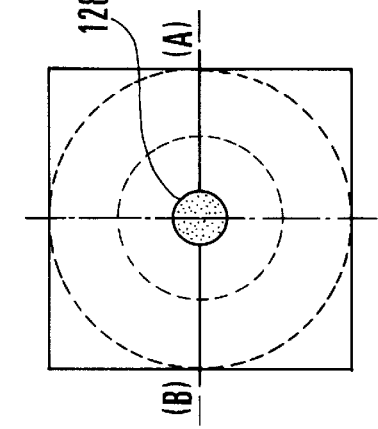
FIG.4(a)   FIG.4(b)
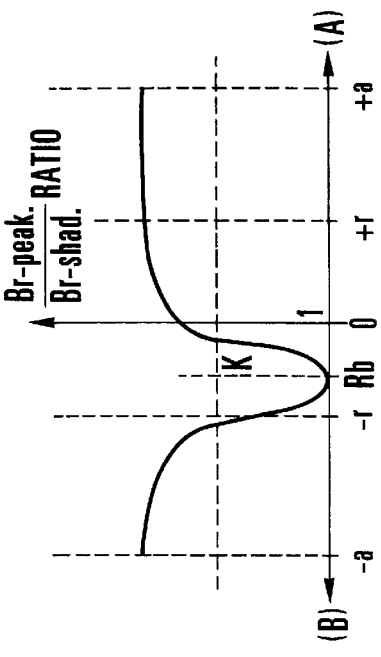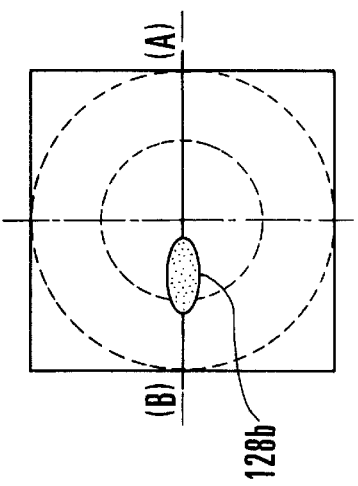
FIG.5(a)   FIG.5(b)

CAMERA

This is a continuation application under 37 CFR 1.62 of prior application Ser. No. 08/556,858 filed on Nov. 2, 1995 (abandoned).

BACKGROUND OF THE INVENTION

1. Field of the Invention

This invention relates to a camera having a shadow-occurring-state detecting means for detecting a shadow appearing at an object in taking a shot with the camera.

2. Description of the Related Art

The recent advancement of electronic control technology has enabled cameras of these days to permit taking shots in more versatile light adjusting states than old-fashioned cameras. Hence, cameras of varied kinds have been proposed in this respect and put on the market. These cameras, for example, include (a) A camera arranged to measure the luminance of an object of shooting and to automatically cause a flash device to flash when the measured luminance is less than a predetermined value, for example, as disclosed in the specification of U.S. Pat. No. Re 29,599.

(b) A camera arranged to measure the luminance of a shooting object, to cause a flash device to fully flash when the measured object luminance is less than a predetermined value and to cause the flash device to perform daylight synchro-flash (fill-in flash) when the measured luminance is greater than the predetermined value, for example, as disclosed in the specification of U.S. Pat. No. 4,812,872; and (c) A camera arranged to measure luminance obtained in a middle part and a peripheral part of a photo-taking picture plane and to automatically cause a flash device to flash when the shooting object is judged to be in a back-light state from a difference in luminance between the middle part and the peripheral part, for example, as disclosed in the specification of U.S. Pat. No. 4,666,280.

However, none of these cameras are arranged to detect and predict, on the basis of the direction and intensity of incident light coming from a light source, the state of a shadow appearing at the object at the time of taking a shot and to control photographing conditions according to the result of prediction.

SUMMARY OF THE INVENTION

It is one aspect of the invention under the present application to provide a camera which performs a photographing operation in a photographing condition suited for the state of a light source by detecting a shadow appearing in taking a shot according to the state of the light source. To attain this aspect, a camera according to the invention includes a light receiving element part for receiving a light flux coming from a light source, a processing circuit for deciding the direction and intensity of the light flux coming from the light source on the basis of an output of the light receiving element part, and a photographing condition setting circuit for setting a photographing condition according to a result of the decision made by the processing circuit.

To attain the above-stated object, a camera according to the invention is arranged to decide the direction and intensity of a light flux coming from a light source on the basis of a center-of-gravity position of an image formed on the above-stated light receiving element part and data corresponding to a ratio or a difference between a luminance value obtained at the center-of-gravity position and a luminance value obtained at a position located away from the center-of-gravity position. Another camera which attains the above-stated object is arranged to decide the direction and intensity of a light flux coming from a light source on the basis of a state of luminance distribution on the light receiving element part.

It is another aspect of the invention to provide a camera arranged to carry out a photographing operation in a mode suited for a photographing condition, for example, by causing a flash device to flash according to the instruction of an instructing circuit in anticipation of appearance of a shadow in a case where the object of shooting is being illuminated with an intensive light flux. To attain the aspect, a camera is provided with a light measuring circuit, a first comparison circuit for comparing a signal value corresponding to an output of the light measuring circuit with a predetermined value and for generating an output when the signal value is higher than the predetermined value, and an instructing circuit for giving an instruction for flash photography in response to the output of the first comparison circuit.

Under the object mentioned above, the camera is provided with a second comparison circuit for substantially comparing a value corresponding to the output of the light measuring circuit and a film sensitivity with a predetermined value and for generating an output when the predetermined value is higher, and an instructing circuit for giving an instruction for flashing in response to the output of the second comparison circuit. The camera is arranged to flash by controlling a flashing action in such a manner that a threshold level of the flashing is set in relation to the film sensitivity when an object luminance is low and the threshold level of the flashing is set at a predetermined luminance level irrespective of the film sensitivity when the object luminance is high.

Under the above-stated object, another camera is provided with a distance value signal forming circuit for forming a distance value signal corresponding to an object distance and an inhibiting circuit for inhibiting the instructing circuit from giving an instruction for flash photography when the distance value signal from the distance value signal forming circuit indicates a distance farther than a predetermined value. Thus, the camera is arranged such that flash photography is carried out only when the object is located in a distance range within which the above-stated shadow can be erased.

These and other objects and features of the invention will become apparent from the following detailed description of embodiments thereof taken in connection with the accompanying drawings.

BRIEF DESCRIPTION OF THE DRAWINGS

FIG. 4(a) is a front view showing a shadow 128a of an index 127 appearing on the image sensor 125 when the sun is located at a zenith position in a clear sky.

FIG. 4(b) shows a luminance distribution then obtained on the image sensor 125 under the same condition.

FIG. 5(a) is a front view showing a shadow 128b of the index 127 appearing on the image sensor 125 when the sun declines to the right from the zenith position in a slightly cloudy weather. FIG. 5(b) shows a luminance distribution obtained on the image sensor 125 under that condition.

DETAILED DESCRIPTION OF THE PREFERRED EMBODIMENTS

Some of preferred embodiments of the invention are described below with reference to the drawings.

First Embodiment

Figure 1:
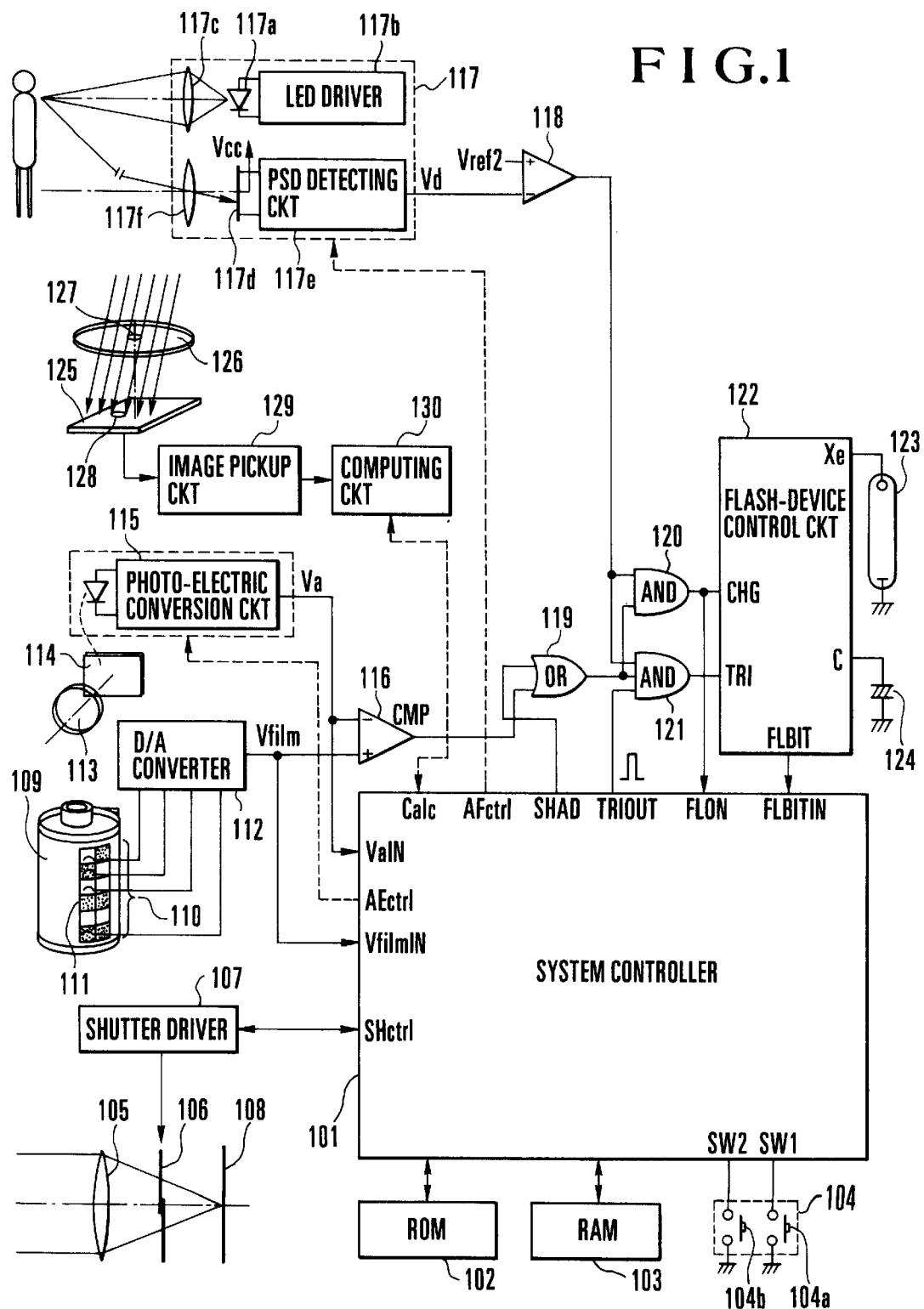
FIG. 1 is a block diagram showing in outline the arrangement of essential parts of a camera arranged according to the invention as a first embodiment thereof.

A first embodiment of the invention is described with reference to FIGS. 1 to 9 as follows. FIG. 1 shows the electrical arrangement of essential parts of a camera which is the first embodiment. Referring to FIG. 1, a system controller 101 is arranged to control the actions of the whole camera. A ROM 102 (a read-only memory) stores programs and data. A RAM 103 (a readable and writable memory) stores data. A release button 104 is provided for a release action of the camera. A switch 104a is arranged to cause the camera to perform a battery check and light and distance measuring actions in response to a first stroke of a pushing operation on the release button 104. A switch 104b is arranged to cause the camera to perform an exposure action on a film in response to a second stroke of the pushing operation on the release button 104. The camera has a photo-taking lens 105, a shutter 106, and a shutter driver 107, i.e., a shutter driving circuit, which is arranged to drive the shutter 106. Reference numeral 108 denotes the film. A film cartridge 109 is provided with a film characteristic recording part 110 which is arranged on the external surface of the film cartridge 109 to store in a coded state information on the characteristic of the film, such as film sensitivity, a photographable number of frames, etc. A metal contact piece 111 is arranged to detect the characteristic of the film. A converter 112 is arranged to convert the coded value of film sensitivity into an analog voltage value (Vfilm). The converter 112 has such a characteristic that the film sensitivity is converted into a lower voltage value as the film sensitivity is higher. The film sensitivity value Vfilm is inputted also to the system controller 101.

The camera includes a light measuring lens 113, a light measuring element 114 such as an SPC (silicon photocell) or the like which is arranged to detect the luminance of the object of shooting. A photo-electric conversion circuit 115 is arranged to convert a photoelectric current detected by the detection area of the light measuring element 114 into a voltage value as a measured light value Va. A comparator 116 is arranged to compare the measured light value Va with the voltage value Vfilm decided by the film sensitivity value. These values Va and Vfilm are respectively supplied to the inverting and non-inverting input terminals of the comparator 116. Meanwhile, both the measured light value Va and the voltage value Vfilm which corresponds to the film sensitivity are inputted also to the system controller 101.

A distance measuring block 117 is powered by voltage Vcc and measures a distance from the camera to an object of shooting. This block 117 includes an infrared light emitting diode 117a which is arranged to emit an infrared beam toward the object, a driving circuit 117b which drives the infrared light emitting diode 117a, a light projecting lens 117c, a position detecting element 117d which is a PSD (position sensing device) or the like and is arranged to detect a received position of a reflected light of the infrared beam, a PSD detecting circuit 117e which is arranged to output a voltage value Vd in proportion to the object distance, and a light receiving lens 117f.

A comparator 118 is arranged to compare the output Vd of the PSD detecting circuit 117e with a predetermined voltage value Vref2. The comparator 118 receives the object distance value Vd at its inverting input terminal and the predetermined voltage value Vref2 at its non-inverting input terminal.

The camera further includes an OR gate 119, AND gates 120 and 121, a xenon discharge lamp 123 and a capacitor 124 arranged to store electric charge for flashing a flash device.

A flash-device control circuit 122 is arranged to charge the flash device and to cause flashing. When a high level signal is applied to a terminal TRI of the flash-device control circuit 122, the xenon discharge lamp 123 flashes, power being then supplied from terminal Xe. When a high level signal is applied to a terminal CHG of the flash-device control circuit 123, the capacitor 124 is charged, power being then supplied from terminal C. Then, a signal indicative of a charged state of the capacitor 124 is supplied from a terminal FLBIT of the flash-device control circuit 123 to the system controller 101.

An image sensor 125 is arranged to detect the state of a shadow. A glass window 126 having a disc form and a light transmissive characteristic is disposed on the upper surface of the camera. The center of the effective image pickup area of the image sensor 125 coincides with the center of the glass window 126. Reference numeral 128 denotes a shadow of an index 127 which is formed in black color at the center of the glass window 126. An image pickup circuit 129 is connected to the image sensor 125. A computing circuit 130 is arranged to analyze image data received from the image pickup circuit 129.

As indicated in FIG. 1, system controller 101 has terminals for input and output of the information above discussed, namely, SW1, SW2, SHvtrl, VfilmIN, AEctrl, VaIN, AFctrl, SHAD, TRIOUT, FLON and FLBITIN.

Figure 2:
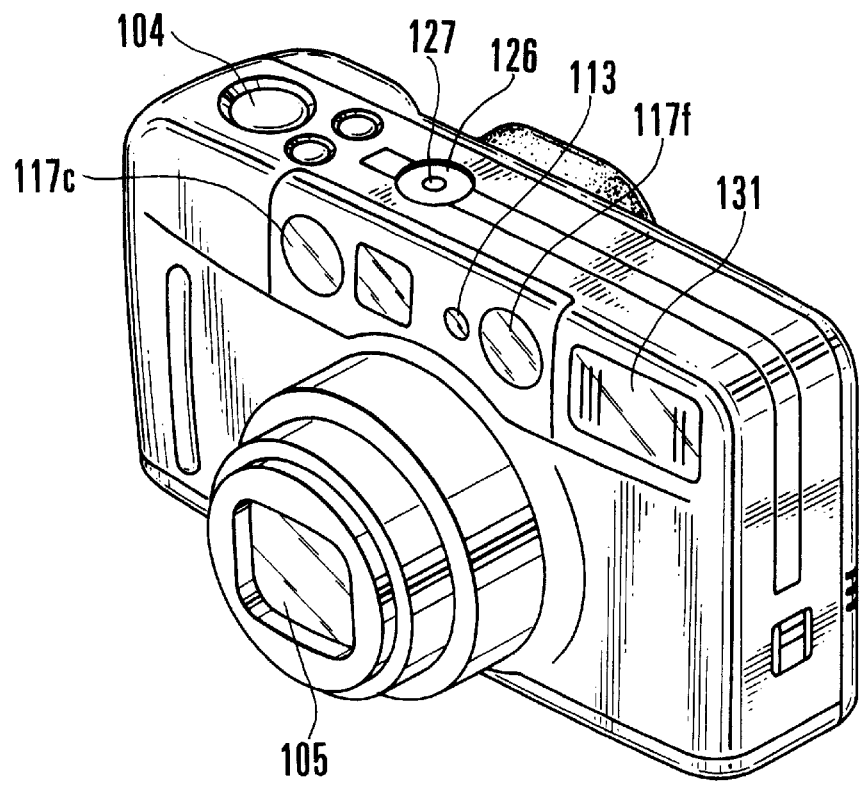
FIG. 2 shows the appearance of the camera which is arranged as shown in FIG. 1 as the first embodiment.

FIG. 2 shows in an oblique view the appearance of the camera which is the first embodiment. Referring to FIG. 2, a Fresnel lens 131 is mounted on the flashing window of the flash device. The illustration includes the shutter release button 104, the photo-taking lens 105, the light measuring lens 113, the glass window 126 arranged to take in light for the shadow detecting image sensor 125, the black index 127 formed at the center of the glass window 126, the distance measuring light projecting lens 117c and the distance measuring light receiving lens 117f.

A method of quantitatively detecting a shadow to be brought about by an external light is described as follows. In a case where the camera is held by the user in a horizontal posture, the glass window 126 is facing upward. When the sunlight falls on the surface of the image sensor 125 through the glass window 126, a shadow 128 of the black index 127 appears on the surface of the image sensor 125. The shadow 128 thus becomes an input to the image sensor 125 along with the sunlight. The size and density of the shadow 128 on the image sensor 125 then vary with the position of the sun and the intensity of the sunlight. For example, the center of gravity of the shadow 128 is located near the center of the image sensor 125 when the altitude of the sun is high, and is located away from the center of the image sensor 125 when the altitude of the sun is low. The shadow 128 becomes smaller into a spot-light shape with an increased density when the sunlight is intense. Conversely, when the sunlight becomes weaker with the sun hidden by a cloud or the like, the size of the shadow 128 comes to increase and its density decreases accordingly.

Therefore, it is possible to decide the current illuminating state of the sunlight by detecting the size and density of the shadow 128 and the luminance obtained around the shadow 128. It is also possible to predict a shadow which will be obtained at the object of shooting.

The principle of a method of predicting a state of occurrence of a shadow is next described with reference to FIG. 3 to FIGS. 8(a) and 8(b) as follows.

Figure 3:
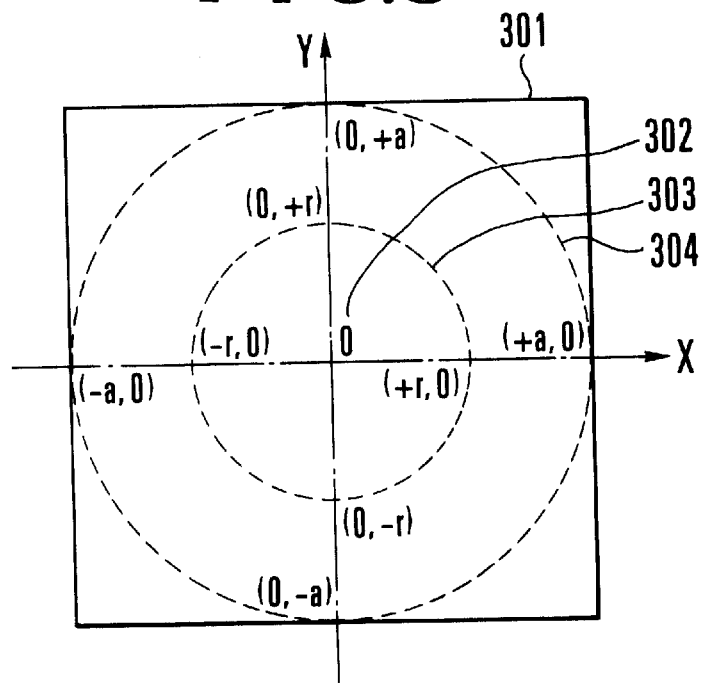
FIG. 3 is an enlarged front view showing the effective image pickup area of an image sensor 125 which is an essential part of a shadow-occurring-state detecting means in the arrangement shown in FIG. 1.

FIG. 3 shows coordinates obtained on the image sensor 126. In FIG. 3, reference numeral 301 denotes an effective image pickup area of the image sensor 125. Reference numeral 302 denotes a central coordinate point. Reference numeral 303 denotes an area within a radius "r" away from the center. Reference numeral 304 denotes an area within another radius "a" away from the center (a>r). In the case of this embodiment, with the length of one side of the effective image pickup area 301 which is square in shape assumed to be "2a", the center point of each side coincides with the outer edge of the area 304 of the radius "a".

Pairs of drawings, FIGS. 4(a) and 4(b) to FIGS. 8(a) and 8(b), show the states of solar insolation on the image sensor 125, in the drawing parts (a), and the states of output of the image sensor 125 obtained under the states of the solar insolation, in the drawing parts (b).

FIGS. 4(b), 5(b), 6(b), 7(b) and 8(b) are sectional views taken respectively on lines (A)–(B) indicated in FIGS. 4(a), 5(a), 6(a), 7(a) and 8(a). Further each of FIGS. 4(b) to 8(b) shows, on its axis of ordinate, the output of the image sensor 125, i.e., the distribution of luminance ratio (or difference). With a luminance Br-shad obtained at the center-of-gravity position of the shadow 128 assumed to be "1", a luminance Br-peak obtained from around the center of gravity is shown in each of FIGS. 4(b) to 8(b).

Further, in these drawings, reference symbol K denotes a predetermined luminance ratio (threshold value) to be used as a reference in predicting appearance of a shadow in a picture to be taken.

FIG. 4(a) shows a case where the sun is near to a zenith position in a clear sky allowing direct solar insolation without any cloud blocking the sun. Under this condition, the shadow 128a of the black index 127 formed on the glass window 126 is in the same circular shape as the index 127. Then, the center of gravity Ra of the shadow 128a coincides with the center 302 of the image sensor 125, and the density of the shadow 128a is very thick. Under this condition, the output of the image sensor 125 is as shown in FIG. 4(b) by a downward protruding curve which has a steep inclination within the area of the shadow 128a. The output thus shows a minimum value at the center of the image sensor 125. Outside of the shadow 128a, the downward protruding curve has a horizontal shape showing a fixed value which is larger than the above-stated predetermined luminance ratio value K.

FIG. 5(a) shows the state of a shadow 128b of the index 127 obtained on the surface of the image sensor 125 when the sun declines a little in the direction (A) from the zenith position in a slightly cloudy sky. FIG. 5(b) shows the state of output of the image sensor 125 obtained under this condition. The center of gravity Rb of the shadow 128b of the index 127 deviates in the direction (B) from the center of the image sensor 125. The center of gravity Rb, however, remains within an area 303 of the radius r. Further, in this case as shown in FIG. 5(b), the output of the image sensor 125, i.e., the distribution of luminance ratio, is represented by a downward protruding curve, which shows a minimum value at a point Rb deviating from the center of the image sensor 125 in the direction (B), and asymptote parts, which show, outside of a downward protruding part corresponding to the shadow 128b, values gradually converging into a certain fixed value higher than the predetermined value K. The inclination of the downward projecting curved part corresponding to the shadow 128b is more moderate than in the case of FIG. 4(b), and the radius of curvature of parts continuing to the asymptote parts which correspond to areas outside of the shadow 128b is larger than that of FIG. 4(b).

Figure 6A:
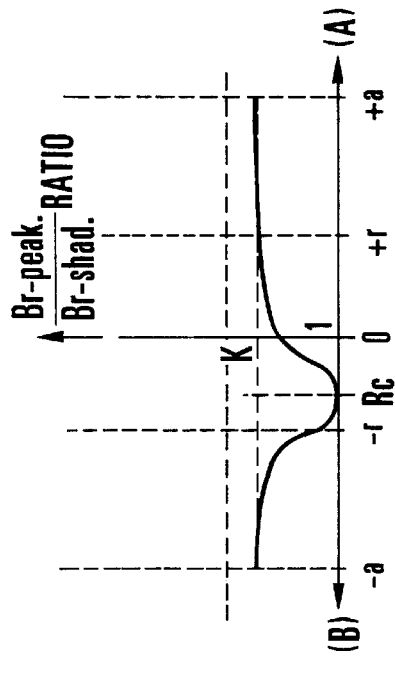
FIG. 6(a) is a front view showing a shadow 128c of the index 127 appearing on the image sensor 125 when the sun declines to a lower right position from the zenith position in a cloudy weather.
Figure 6B:
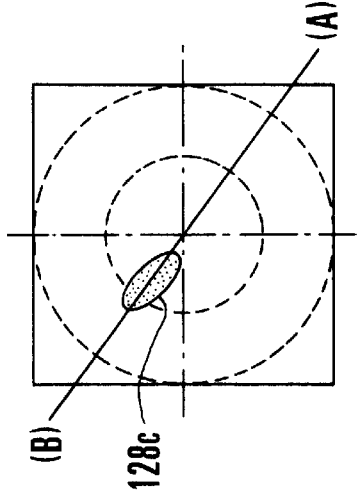
FIG. 6(b) shows a luminance distribution obtained on the image sensor 125 under that condition.

FIG. 6(a) shows a case where the sun declines in the direction of an axis (A)–(B) which slants in a rectangular coordinate system on the camera (in the direction of connecting second and fourth quadrants) and is deviating in the direction (A) in a cloudy weather. A shadow 128c of the index 127 appearing under this condition is in an oblong shape extending along the line (A)–(B). The center of gravity Rc of the shadow 128c is in a position deviating in the direction (B) from the center of the image sensor 125 and is within the area 303 of the radius r. As shown in FIG. 6(b), under a cloudy sky like in this case, the luminance ratio distribution on the image sensor 125, i.e., the output of the image sensor 125, becomes a downward protruding curve which shows a minimum value at the point Rc deviating from the center of the image sensor 125 in the direction (B) and takes, outside of a part corresponding to the shadow 128c, an asymptote shape which converges into the predetermined value K. Further, the inclination of the downward protruding curve part which corresponds to the shadow 128c is more moderate than in the case of FIG. 5(b), and the radius of curvature of a part continuing to the asymptote part which corresponds to an area located outside of the shadow 128c is also larger than that of FIG. 5(b).

Figure 7A:
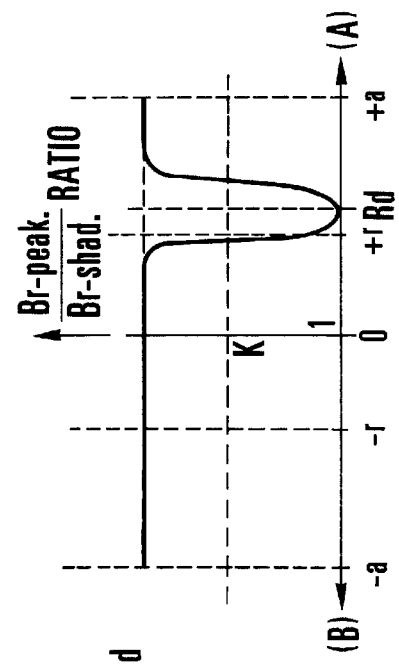
FIG. 7(a) is a front view showing a shadow 128d of the index 127 appearing on the image sensor 125 when the sun declines to a lower left position from the zenith position in a clear sky.
Figure 7B:
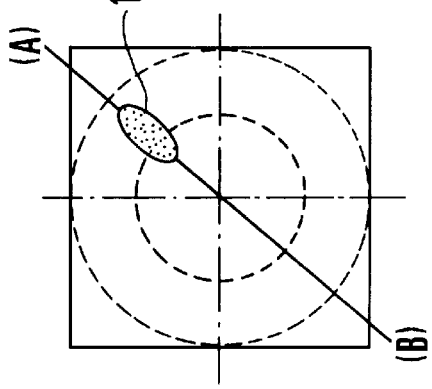
FIG. 7(b) shows a luminance distribution obtained on the image sensor 125 under that condition.

FIG. 7(a) shows the position of a shadow 128d of the black index 127 obtained when the sun declines in a clear sky in the direction (B) (toward the third quadrant) along a line (A)–(B) which slants upward to the right, connecting first and third quadrants in a rectangular coordinate system on the camera. FIG. 7(b) shows the output of the image sensor 125 indicating a luminance ratio distribution obtained on the surface of the image sensor 125 under the condition of FIG. 7(a). In this case, the center of gravity Rd of the shadow 128d is located outside of the area 303 of the radius r. As shown in FIG. 7(b), the output of the image sensor 125 includes a downward protruding curve which shows a minimum value at the point Rd deviating from the center of the image sensor 125 in the direction (A), and shows a fixed value for an area outside of the downward protruding curve part which corresponds to the shadow 128d. The inclination of the downward protruding curve part is steeper than in the cases of the cloudy sky as shown in FIGS. 5(b) and 6(b) but is more moderate than in the case of FIG. 4(b), in which the sun is located in a zenith position in a clear sky.

Figures 8A, 8B:
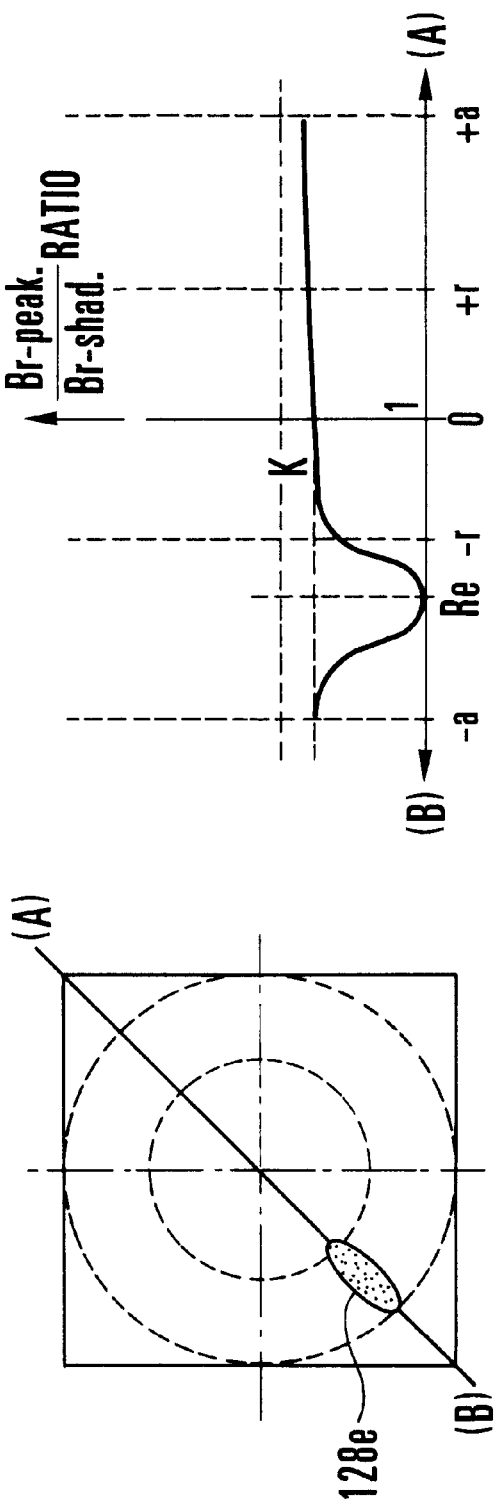
FIG. 8(a) is a front view showing a shadow 128e of the index 127 appearing on the image sensor 125 when the sun declines to an upper right position from the zenith position in a cloudy weather.
FIG. 8(b) shows a luminance distribution obtained on the image sensor 125 under that condition.

FIG. 8(a) shows the position of a shadow 128e of the black index 127 obtained on the image sensor 125 when the sun declines aslant, in a cloudy sky, in the direction (A) (toward the first quadrant) along a line segment (A)–(B) which is connecting first and third quadrants in the rectangular coordinate system on the camera. FIG. 8(b) shows the output of the image sensor 125, i.e., a luminance ratio distribution, obtained under this condition, on the image sensor 125.

Under this condition, the shadow 128e of the black index 127 appears in a position deviating from the center of the image sensor 125 in the direction (B). The center of gravity Re of the shadow 128e is located in the area 304 which is outside of the area 303 of the radius r. Further, as shown in FIG. 8(b), the luminance ratio distribution on the image sensor 125 is represented by a downward protruding curve part which shows a minimum value at the point Re deviating from the center of the image sensor 125 in the direction (B) and an asymptote part which converges into the predetermined value K. The downward protruding curve corresponds to the shadow 128e while the asymptote part corresponds to areas located outside of the shadow 128e.

Since the sky is cloudy in the case of FIG. 8(b), the density of the shadow 128e is thin. Therefore, the inclination of the downward protruding curve part is moderate like in the case of FIG. 6(b), and the level of the luminance ratio distribution curve, i.e., the output level of the image sensor 125 is lower than in the case of a clear sky.

As described above, a state of occurrence of a shadow is thus quantitatively predictable on the basis of the luminance distribution on the image sensor 125, i.e., the output of the image sensor 125, which corresponds to the direction of incidence of the sunlight on the glass window 126 and the conditions of weather.

Next, a shadow occurrence detecting action and the action of each part of the camera to be carried out in taking a picture with the first embodiment are described with reference to FIGS. 1 to 9 as follows.

Figure 9:
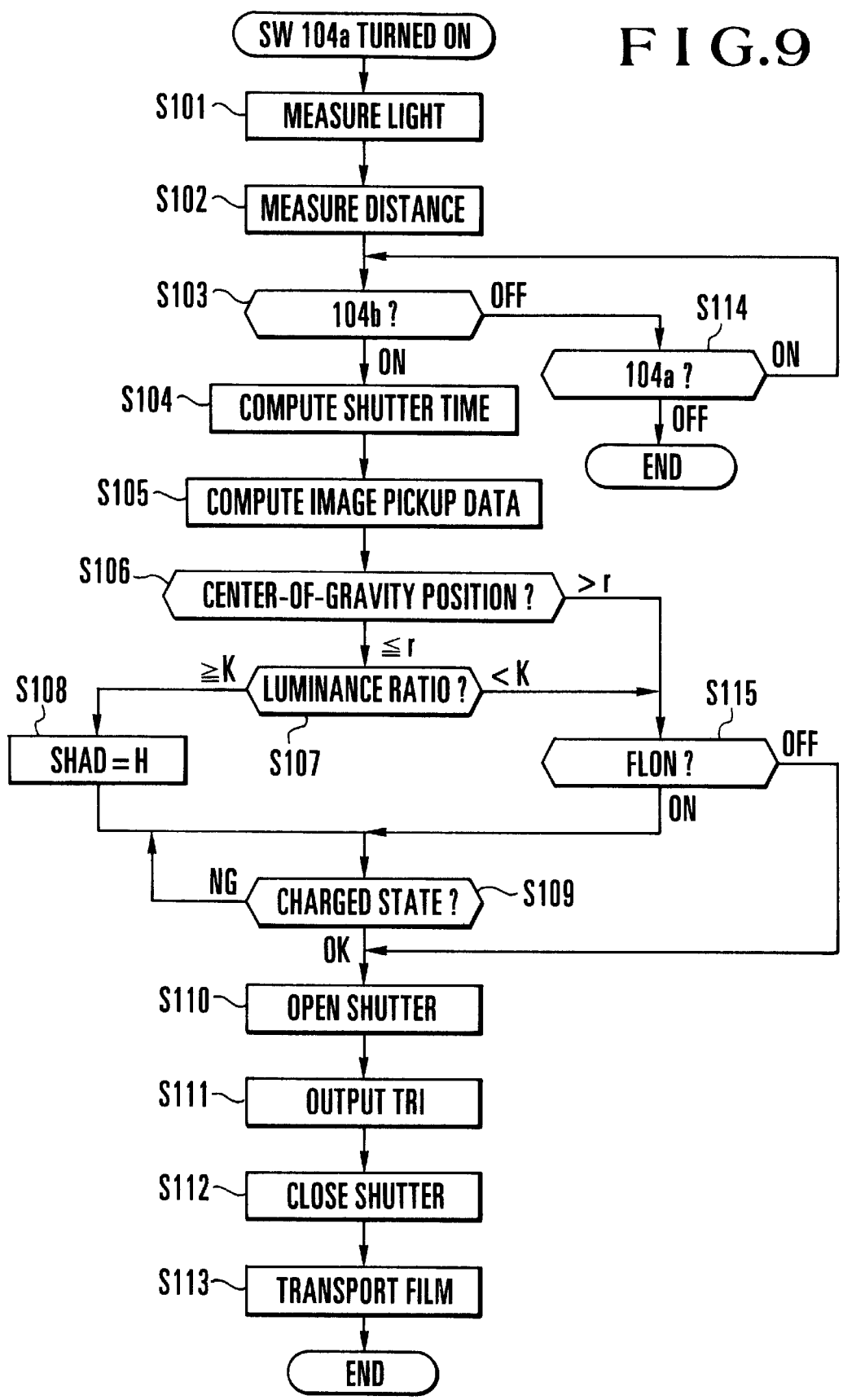
FIG. 9 is a flow chart showing the control actions of a system controller of the camera shown in FIGS. 1 and 2 and also the actions of the camera.

FIG. 9 is a flow chart showing the control actions to be performed by the system controller 101 of the camera which is the first embodiment. The shadow occurrence detecting action is arranged to be performed by the system controller 101 in conjunction with the computing circuit 130. In accordance with an instruction signal from the system controller 101, the computing circuit 130 takes in an output of the image pickup circuit 129 and computes the center-of-gravity position R of the shadow 128 relative to the center 302 of the image sensor 125 and the above-stated luminance distribution. The shadow occurrence detecting action is performed with information on the center-of-gravity position R and the luminance distribution supplied to the system controller 101.

The action of each part of the camera is now described with reference to the flow chart of FIG. 9 as follows.

The camera user (operator) directs the camera toward an object of shooting and pushes down the shutter release button 104 as much as a first stroke thereof. The switch 104a then turns on and the system controller 101 comes to operate beginning with a step S101.

At the step S101, the luminance of the object is measured. An output Va which corresponds to the object luminance is outputted from the photo-electric conversion circuit 115. At the same time, the comparator 116 compares the value of the object luminance Va with the value of output Vfilm of the D/A converter 112 which is determined by the sensitivity of a film in use. If the object luminance value Va is found to be lower than the output value Vfilm of the D/A converter 112, the output of the comparator 116 is at a high level. When the output of the comparator 116 is at a high level, the level of the output of the OR gate 119 becomes high. The measured light value Va is analog-to-digital converted and is supplied to the system controller 101 to be used as a variable in deciding exposure conditions through a computing operation.

At a step S102, a distance to an object of shooting is measured by the distance measuring block 117. The details of the distance measuring method are omitted from description. The result of distance measurement is outputted from the PSD detecting circuit 117e as a measured distance value Vd. The distance value Vd is compared with a predetermined value Vref2 by the comparator 118. The output (distance value) Vd of the PSD detecting circuit 117e varies in proportion to the object distance and becomes smaller as the object distance decreases. Therefore, if the object distance is found to be smaller than the value Vref2 which corresponds to a predetermined distance, the level of the output of the comparator 118 becomes high. If both the level of the output of the comparator 118 and that of the output of the OR gate 119 are high, the level of the AND gate 120 becomes high. In that case, the flash-device control circuit 122 begins to charge the capacitor 124.

At a step S103, a check is made for the state of the release switch 104b. If the release switch 104b is found to be in an on-state, the flow of operation comes to a step S104. If not, the flow comes to a step S114.

At the step S114, with the release switch 104b found to be in an off-state, a check is made again for the state of the release-standby switch 104a. If the release-standby switch 104a is found to be in its on-state, the flow comes back to the step S103. If the release-standby switch 104a is found to be in an off-state, the flow comes to an end.

With the release switch 104b found in the on-state at the step S103, the flow comes to the step S104. At the step S104, a shutter speed is computed on the basis of the measured object luminance value obtained by the step S101 and the film sensitivity.

At a step S105, the shadow 128 is subjected to a computing operation by the computing circuit 130 on the basis of image pickup data. The details of this computing operation are the same as what has been described in the foregoing.

At a step S106, the computed image pickup data is checked for the center-of-gravity position R of the shadow 128. If the center-of-gravity position R is found to be within the predetermined radius r, the flow comes to a step S107. If not, the flow comes to a step S115.

At the step S107, the ratio of the luminance value of the center-of-gravity position R of the shadow 128 to the luminance value obtained around the center-of-gravity position R is compared with the predetermined value K. The flow comes to a step S108 if the ratio is larger than the predetermined value K and to the step S115 if the ratio is smaller than the predetermined value K.

At the step S108, a port SHAD of the system controller 101 is set at a high level. With the port SHAD set at the high level, the level of the output of the OR gate 119 becomes high. Then, if the output of the comparator 118 is also at a high level at the same time, the level of the AND gate 120 becomes high. The level of an input CHG of the flash-device control circuit 122 then becomes high to cause the flash-device control circuit 122 to begin to charge the capacitor 124.

At a step S109, a check is made for the charged state of the capacitor 124. If the capacitor 124 is found to have been completely charged, the flow comes to a step S110.

At the step S110, the shutter 106 is opened.

At a step S111, a flash-device flashing signal TR1 is outputted. The signal TR1 is a pulse signal the level of which is high for a predetermined time.

The AND gate 121 is arranged to have three inputs. If both of the inputs other than the flash-device flashing signal TR1, i.e., both the output of the comparator 118 and the output of the OR gate 119, are at high levels, the output of the AND gate 121 remains at a high level for a predetermined period of time. As a result, the xenon discharge lamp 123 is caused to flash.

At a step S112, the shutter 106 is closed after the lapse of the shutter time computed by the step S104.

At a step S113, a predetermined amount of the film 108 is transported by a film transport means which is not shown. The flow of operation then comes to an end.

If both the results of computation by the steps S106 and S107 are found to be less than predetermined values, the flow of operation is executed as follows.

The flow comes from the step S107 to the step S115. At the step S115, a check is made for the current photographing conditions to find if flashing by the flash device is necessary. If so, the flow comes to the step S109. If not, the flow comes to the step S110.

It goes without saying that a threshold value for the amount of deviation of the center-of-gravity position of the shadow 128 from the center 302 of the image sensor 125 and the threshold value K for the ratio of the peripheral luminance value (the luminance value obtained around the center-of-gravity position of the shadow 128) to the luminance value of the center of gravity are derivable from various conditions such as the altitude of the sun, the degree of diffusion of the sunlight due to a cloud, etc.

The first embodiment is arranged, as described above, to detect how a shadow will be brought about by a photographing light source and to automatically erase the shadow by causing the flash device to flash when the light source is found to be of such a luminance and a direction that bring about a shadow at the object of shooting. In addition to this arrangement, the camera may be also arranged according to the invention to automatically make exposure compensation in a case where the shadow occurring state is found to be likely to bring about a back-light shooting condition for the camera.

Further, a threshold object distance at which the flash device must be inhibited from flashing is of course variable according to a combination of the guide number of the flash device and the F-number of the lens.

Second Embodiment

In the camera according to the first embodiment, a dedicated shadow detecting means, consisting of the glass window 126, the black index 127 and the image sensor 125, and the image pickup circuit 129 and the computing circuit 130 which are arranged to process the output of the image sensor 125, are arranged outside of the system controller 101 as components of a shadow-occurring-state detecting means. However, the arrangement of the first embodiment may be changed to predict a shadow occurring state by utilizing the measured luminance value of the object.

Figure 10:
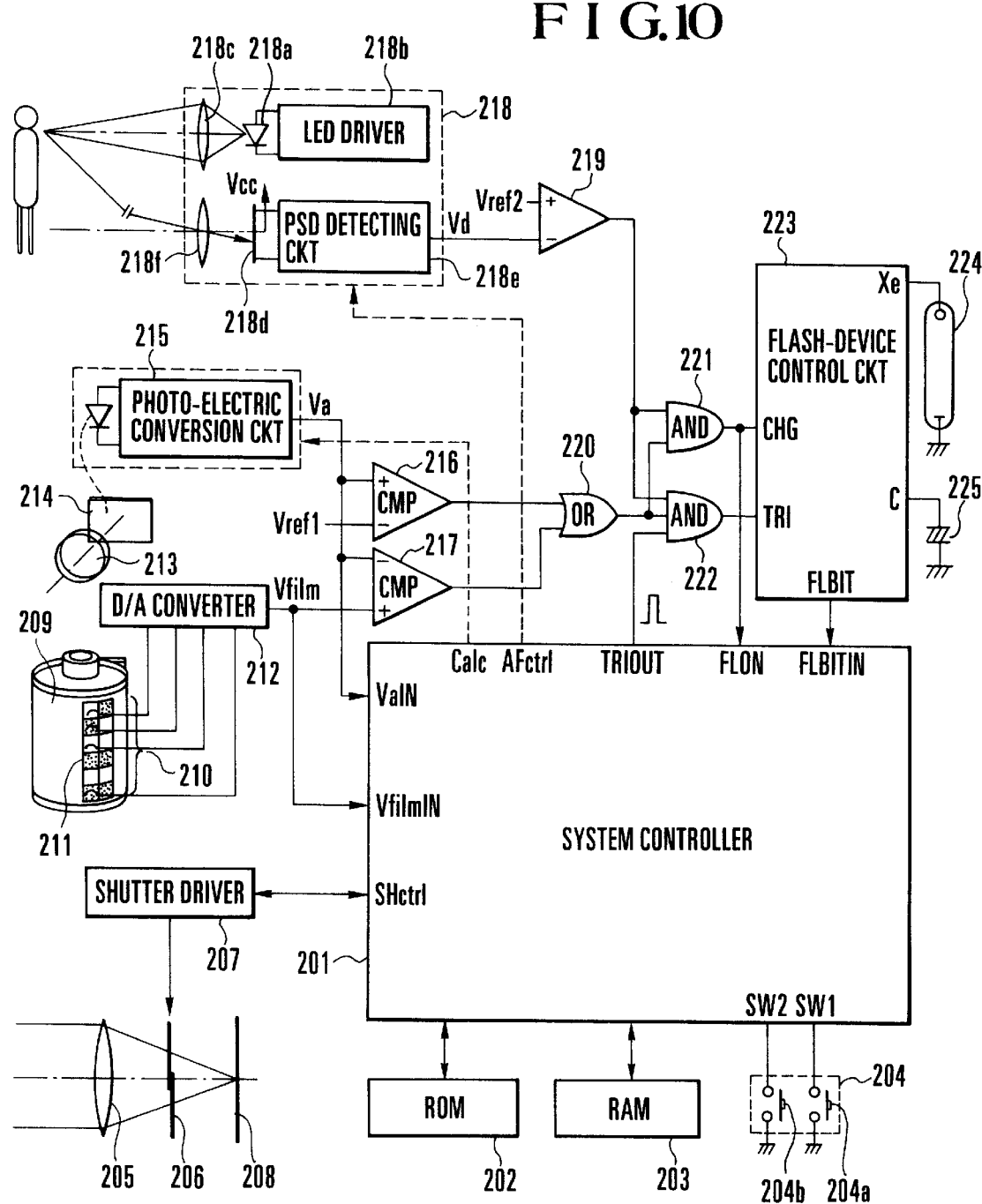
FIG. 10 is a block diagram showing in outline the arrangement of essential parts of a camera arranged as a second embodiment of the invention.

In the case of the second embodiment, the invention is applied to a camera which is arranged on the concept mentioned above. FIG. 10 shows the arrangement of essential parts of the camera which is the second embodiment of the invention. Referring to FIG. 10, a system controller 201 is composed of a microcomputer, etc. A ROM 202 stores programs and data. A RAM 203 stores data. A shutter release button 204 is provided with a switch 204a which is arranged to turn on when the shutter release button 204 is pushed down to a first stroke of operation, and a switch 204b which is arranged to turn on when the shutter release button 204 is pushed down further to a second stroke. The illustration includes a photo-taking lens 205, a shutter 206, a shutter driver 207, i.e., a shutter driving circuit, a film 208, a film cartridge 209, and a film characteristic recording part 210 which is arranged on the external surface of the film cartridge 209 to indicate in a coded form the characteristic of the film such as the sensitivity of the film, a number of photographable frames, etc. A metal contact piece 211 is arranged to detect the film characteristic. A D/A converter 212 converts the coded film sensitivity value into an analog voltage value Vfilm. The D/A converter 212 is arranged to convert the film sensitivity into a lower voltage as the film sensitivity is higher. The film sensitivity value Vfilm is supplied also to the system controller 201.

The camera further includes a light measuring lens 213 and a light measuring element 214 which is an SPD or the like and is arranged to detect the luminance of an object of shooting. A photo-electric conversion circuit 215 is arranged to convert into a voltage value Va a photoelectric current which is detected by the detecting area of the light measuring element 214. A first comparator 216 is arranged to compare a measured light value obtained from within a picture plane with a predetermined value Vref1. A second-comparator 217 compares the measured light value obtained from within the picture plane with the voltage value Vfilm which is decided by the film sensitivity value. The second comparator 217 is arranged to have the voltage value Vfilm supplied to its non-inverting input terminal and the measured light value Va to its inverting input terminal. Both the measured light value Va and the voltage value Vfilm corresponding to the film sensitivity value are supplied also to the system controller 201.

A distance measuring block 218 is arranged to measure a distance from the camera to an object of shooting. The block 218 consists of an infrared light emitting diode 218a which is arranged to emit an infrared beam toward the object, an LED driver 218b, i.e., an LED driving circuit, a light projecting lens 218c, a position detecting element 218d which is a PSD or the like and is arranged to detect a position where a reflection light of the infrared beam is received, a PSD detecting circuit 218e which is arranged to output a voltage value Vd in proportion to the object distance, and a light receiving lens 218f.

A comparator 219 is arranged to compare the output Vd of the PSD detecting circuit 218e with a predetermined voltage value Vref2. The output Vd which shows an object distance value is supplied to the inverting terminal of the comparator 219 while the predetermined voltage value Vref2 is supplied to the non-inverting terminal of the comparator 219.

The camera further includes an OR gate 220, AND gates 221 and 222, a xenon discharge lamp 224, and a capacitor 225 which is arranged to store electric charge for flashing a flash device. A flash-device control circuit 223 is arranged to charge the flash device and to cause the flash device to flash. The xenon discharge lamp 224 is caused to flash when a high level signal is applied to a terminal TRI of the flash-device control circuit 223 and the capacitor 225 is charged when a high level signal is applied to a terminal CHG of the flash-device control circuit 223. A signal indicative of the charging state is supplied from a terminal FLBIT of the flash-device control circuit 223 to the system controller 201.

Figure 11:
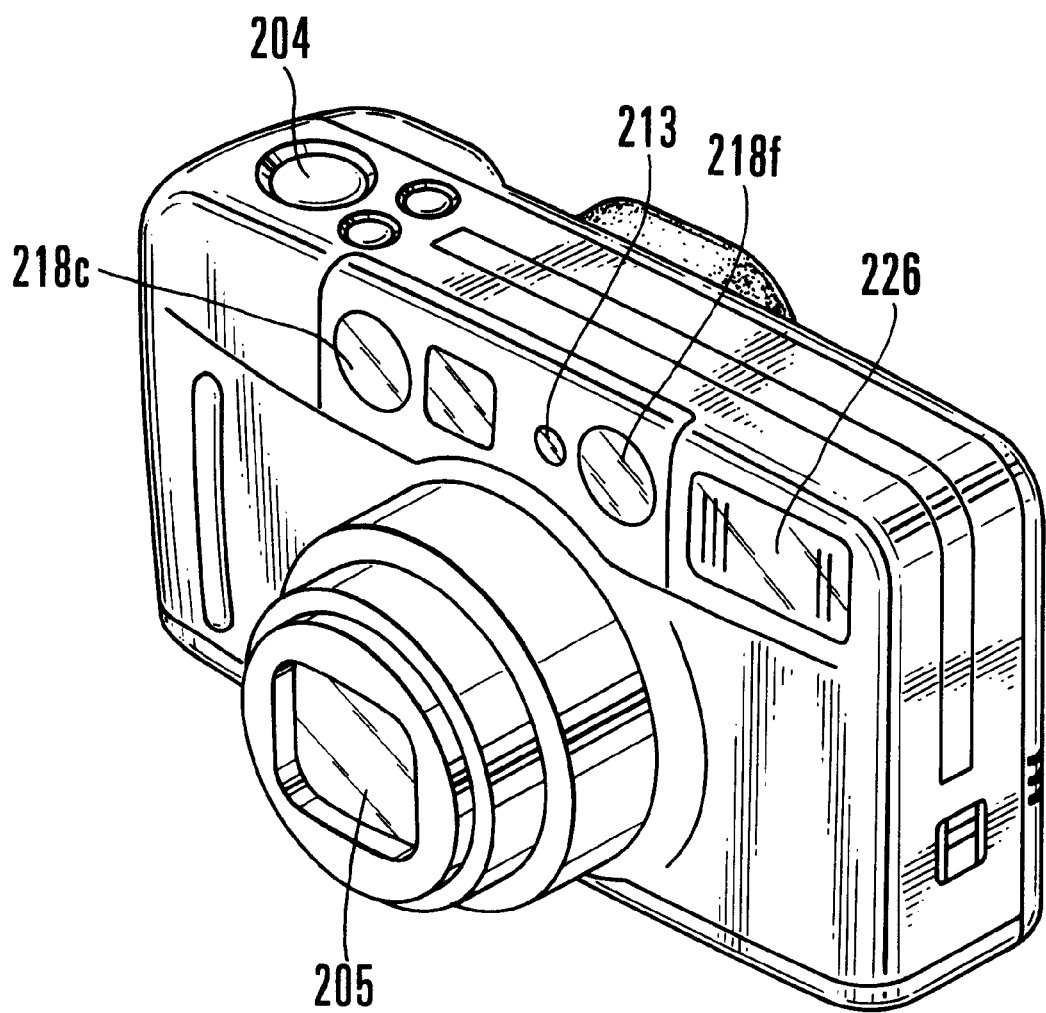
FIG. 11 is an oblique view showing the appearance of the second embodiment of the invention.

FIG. 11 shows in an oblique view the appearance of the camera which is the second embodiment. The illustration includes a Fresnel lens 226 which is mounted on a light emitting window of the flash device, the shutter release button 204, the photo-taking lens 205, the light measuring lens 213, the distance measuring light projecting lens 218c and the distance measuring light receiving lens 218f.

Figure 12:
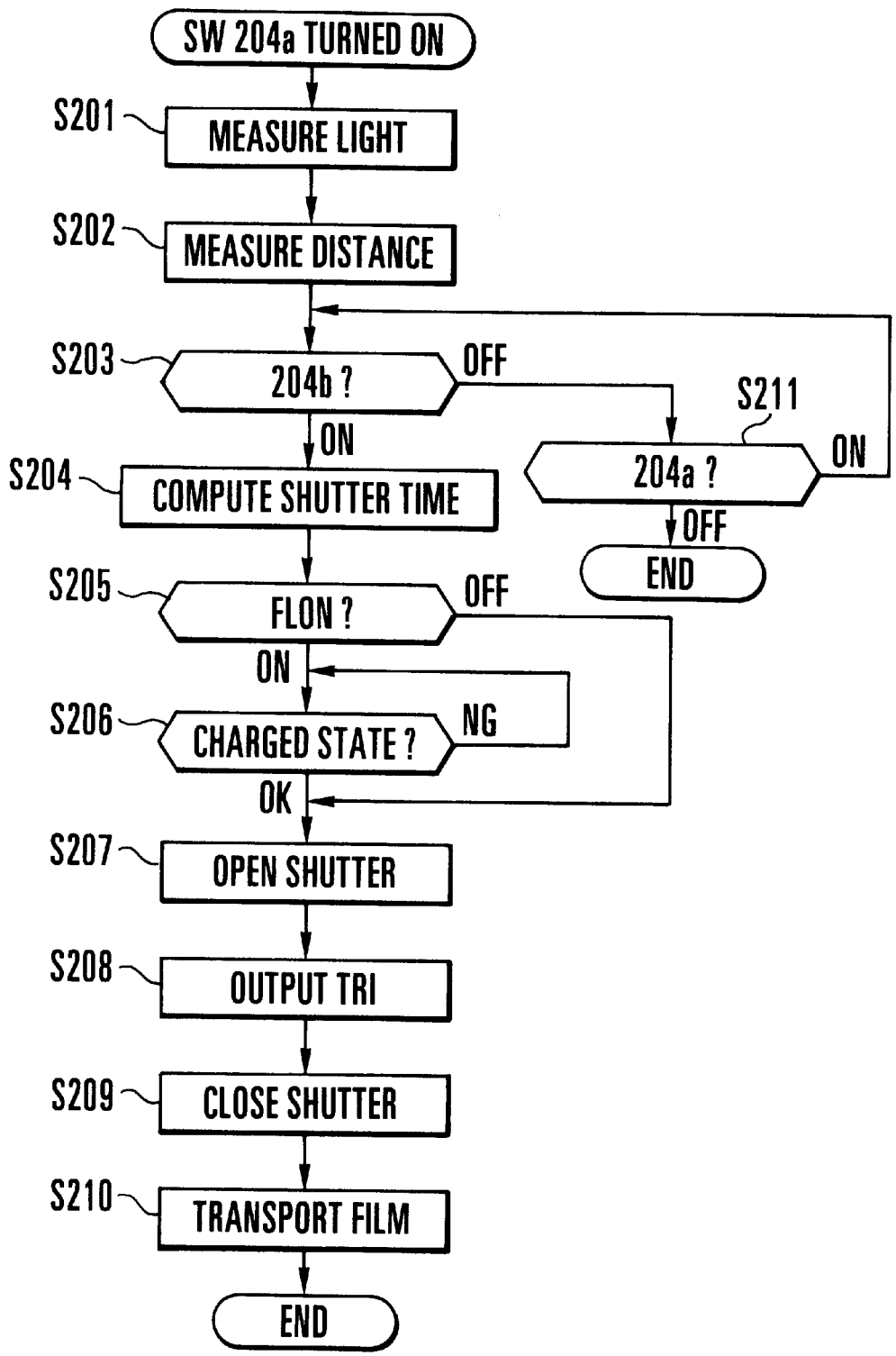
FIG. 12 is a flow chart showing the actions of the camera which is the second embodiment and also the control actions of a system controller of the camera.

FIG. 12 is a flow chart showing the control actions of the system controller 201 of the camera which is the second embodiment. The actions and functions of the camera are described with reference to FIGS. 10 to 12 as follows.

The camera user directs the camera toward the object of shooting and first pushes the shutter release button 204 to a first stroke of operation. This causes the switch 204a to turn on. The system controller 201 then begins to do its control beginning with a step S201 of FIG. 12. At the step S201, the luminance of the object is measured to obtain an object luminance value Va (measured light value). The comparator 216 compares the object luminance value Va with the predetermined value Vref1. If the value Va is found to be larger than the value Vref, the level of the comparator 216 becomes high. At the same time, the object luminance value Va and the output value Vfilm of the D/A converter 212 which is decided by the film sensitivity are compared with each other. If the object luminance value Va is found to be smaller than the output value Vfilm of the D/A converter 212, the level of the output of the comparator 217 becomes high. The level of the OR gate 220 becomes high if the level of the output of either of the comparators 216 and 217 becomes high through these computing actions. The measured light value Va is A/D converted and taken in by the system controller 201 to be computed there.

At a step S202, a distance to the object is measured by the distance measuring block 218. The details of the distance measuring method are omitted from description here. The result of distance measurement is outputted from the PSD detecting circuit 218e as a distance value Vd. The comparator 219 then compares the distance value Vd with a predetermined value Vref2. The output Vd (distance value) of the PSD detecting circuit 218e varies in proportion to the object distance. If the object distance value Vd is found to be smaller than the predetermined distance value Vref2, the level of the output of the comparator 219 becomes high.

If both the output of the comparator 219 and that of the OR gate 220 are at high levels, the level of the AND gate 221 becomes high to cause the flash-device control circuit 223 to begin charging the capacitor 225.

At a step S203, a check is made for the state of the release switch 204b. If the release switch 204b is found to be in an on-state, the flow comes to a step S204. If the release switch 204b is found to be in an off-state, the flow comes to a step S211.

At the step S211, with the release switch 204b found to be in the off-state, a check is made again for the state of the release-standby switch 204a. If the switch 204a is found to be in an on-state, the flow comes back to the step S203. If not, the flow comes to an end.

On the other hand, with the release switch 204b found to be in an on-state at the step S203, the flow comes to the step S204 as mentioned above. At the step S204, a shutter speed is computed according to the object luminance value measured by the step S201 and the film sensitivity.

At a step S205, a check is made to find if the photographing condition requires flashing by the flash device. If so, the flow comes to a step S206. If not, the flow comes to a step S207.

At the step S206, a check is made for the charged state of the capacitor 225. If the capacitor 225 is found to be fully charged, the flow comes to the step S207.

At the step S207, the shutter 206 is opened.

At a step S208, a flash-device flashing signal TRI is outputted. The flash-device flashing signal TRI is a pulse signal which remains at a high level for a predetermined period of time.

The AND gate 222 has three inputs. If both of the two inputs other than the flash-device flashing signal TRI, i.e., if both the output of the comparator 219 and that of the OR gate 220 are at high levels, the AND gate 222 outputs a high level pulse for a predetermined period of time. As a result, the xenon discharge lamp 224 is caused to flash.

At a step S209, the shutter 206 is closed after the lapse of the shutter time which is computed by the step S204.

At a step S210, a predetermined amount of the film 208 is transported by a film transport means which is not shown. After that, the flow comes to an end.

It is of course possible to arrange the second embodiment to vary the threshold distance, i.e., a flash light emission inhibiting distance, according to the guide number of the flash device and the F-number of the photo-taking lens.

The second embodiment is arranged to predict a shadow occurring state by using the result of light measurement made by the light measuring means, without employing any image sensor as a component element of shadow occurring state predicting means, unlike in the case of the first embodiment. According to the arrangement of the second embodiment, therefore, a camera having an automatic shadow erasing function is obtainable at a lower cost than the camera of the first embodiment.

Third Embodiment

Figure 13:
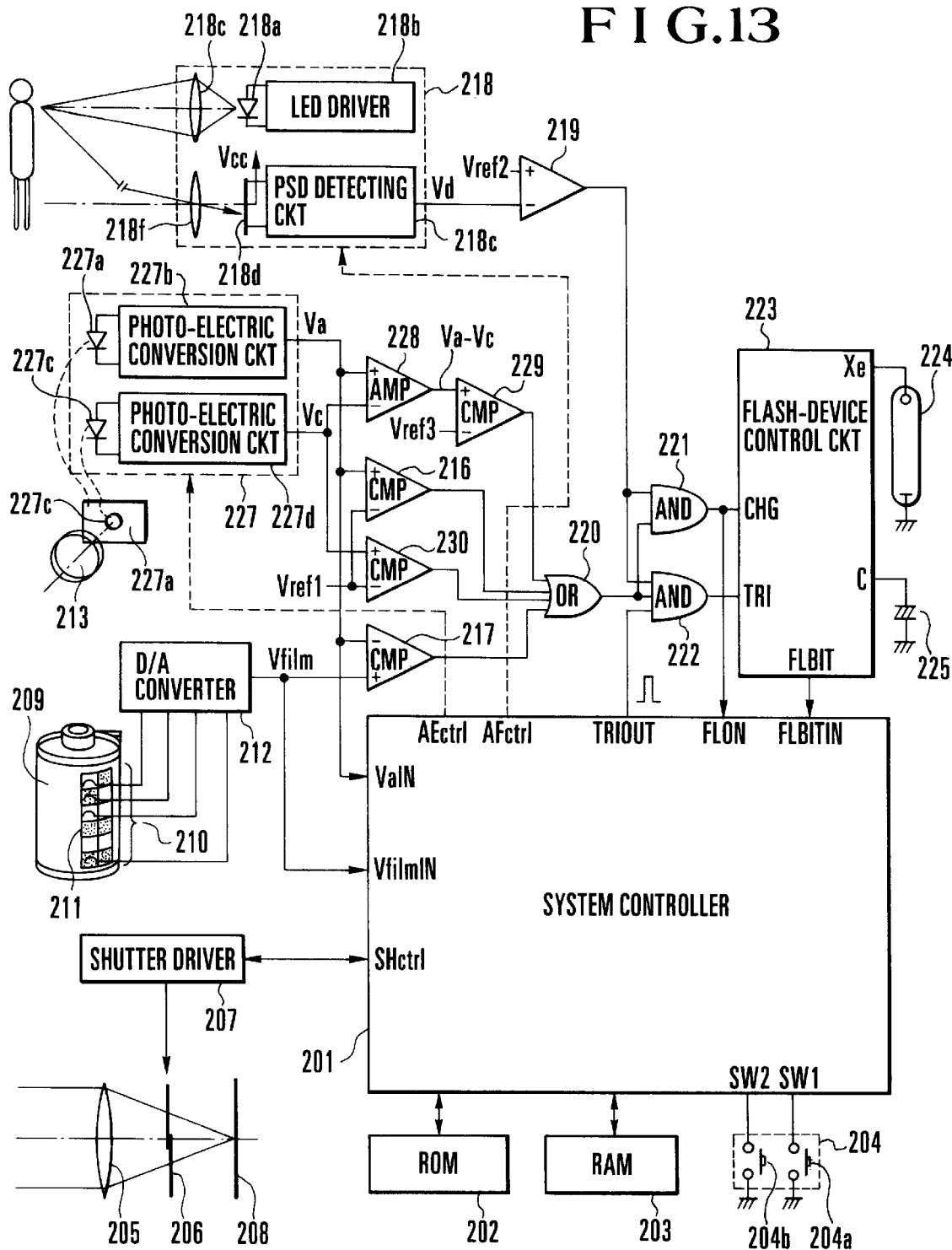
FIG. 13 is a block diagram showing in outline the arrangement of essential parts of a camera arranged as a third embodiment of the invention.

FIG. 13 shows in outline the arrangement of essential parts of a camera which is arranged as a third embodiment of the invention. This camera is arranged to have a back-light detecting function in addition to the automatic shadow erasing function according to the invention. In FIG. 13, the same component parts as those of the second embodiment are indicated by the same reference numerals. The details of these parts are omitted from the following description.

Referring to FIG. 13, a light measuring block 227 includes two divided light measuring elements 227a and 227c which are composed of SPEDs or the like and photo-electric conversion circuits 227b and 227d.

The light measuring element 227c is arranged to measure the light of the middle area of a photo-taking picture plane. The other light measuring element 227a is arranged to measure the light of the peripheral area of the picture plane. The photo-electric conversion circuit 227b is arranged to output a voltage Va while the other photo-electric conversion circuit 227d is arranged to output a voltage Vc.

An operational amplifier circuit 228 is arranged to compute a difference Va-Vc between a measured light (luminance) value obtained from the peripheral area of the picture plane and a measured light value obtained from the middle area of the picture plane. The measured light value Vc obtained from the middle area of the picture plane is arranged to be supplied to the inverting input terminal of the operational amplifier circuit 228 and the measured light value Va obtained from the peripheral area to be supplied to the non-inverting input terminal of the same circuit 228. A comparator 229 is arranged to compare the difference Va-Vc with a predetermined voltage value Vref3 and to have the difference Va-Vc supplied to its non-inverting input terminal and the predetermined voltage value Vref3 to its inverting input terminal.

A comparator 230 is arranged to compare the measured light value Vc obtained from the photo-taking picture plane with a predetermined value Vref1 and to have the measured light value Vc supplied to its non-inverting input terminal and the predetermined value Vref1 to its inverting input terminal.

The operation of the third embodiment is next described with reference to FIG. 13 as follows.

The measured object luminance values Va and Vc are supplied to the operational amplifier circuit 228 to have a difference between the middle luminance value Vc and the peripheral luminance value Va computed the instant the light measuring action is performed. The comparator 229 then compares the difference voltage Va-Vc with the predetermined value Vref3. The level of the output of the comparator 229 becomes high if the peripheral luminance value Va is larger than the middle luminance value Vc by more than the predetermined value Vref3.

Further, the comparator 216 compares the peripheral luminance value Va with the predetermined value Vref1. If the peripheral luminance value Va is larger than the predetermined value Vref1, the level of the output of the comparator 216 becomes high. The comparator 230 also compares the middle luminance value Vc with the predetermined value Vref1. The level of the output of the comparator 230 becomes high if the middle luminance value Vc is larger than the predetermined value Vref1.

Since the outputs of the comparators 216 and 230 are arranged to be inputted to the OR gate 220, if either the luminance of the middle light measuring area or that of the peripheral light measuring area is larger than the predetermined value Vref1, the flash device is charged and is caused to flash when a release action is performed.

The flow of operation of the third embodiment is omitted from description as it is identical with that of the second embodiment described in the foregoing.

The camera which is arranged to have a back-light detecting function as described above can be also arranged to automatically cause the flash device to flash at a luminance value above a predetermined value. The arrangement described gives the following advantages:

(i) In the event of a background having an extremely low reflection factor, a detection error might arise if the object luminance is judged only from the luminance of the peripheral area, whereas such an error can be prevented according to the arrangement described; and (ii) In addition to the back-light detecting function, the camera permits taking a picture which does not show much difference in luminance between a main object and the background of it and also shows no shadow.

Fourth Embodiment

Figure 14:
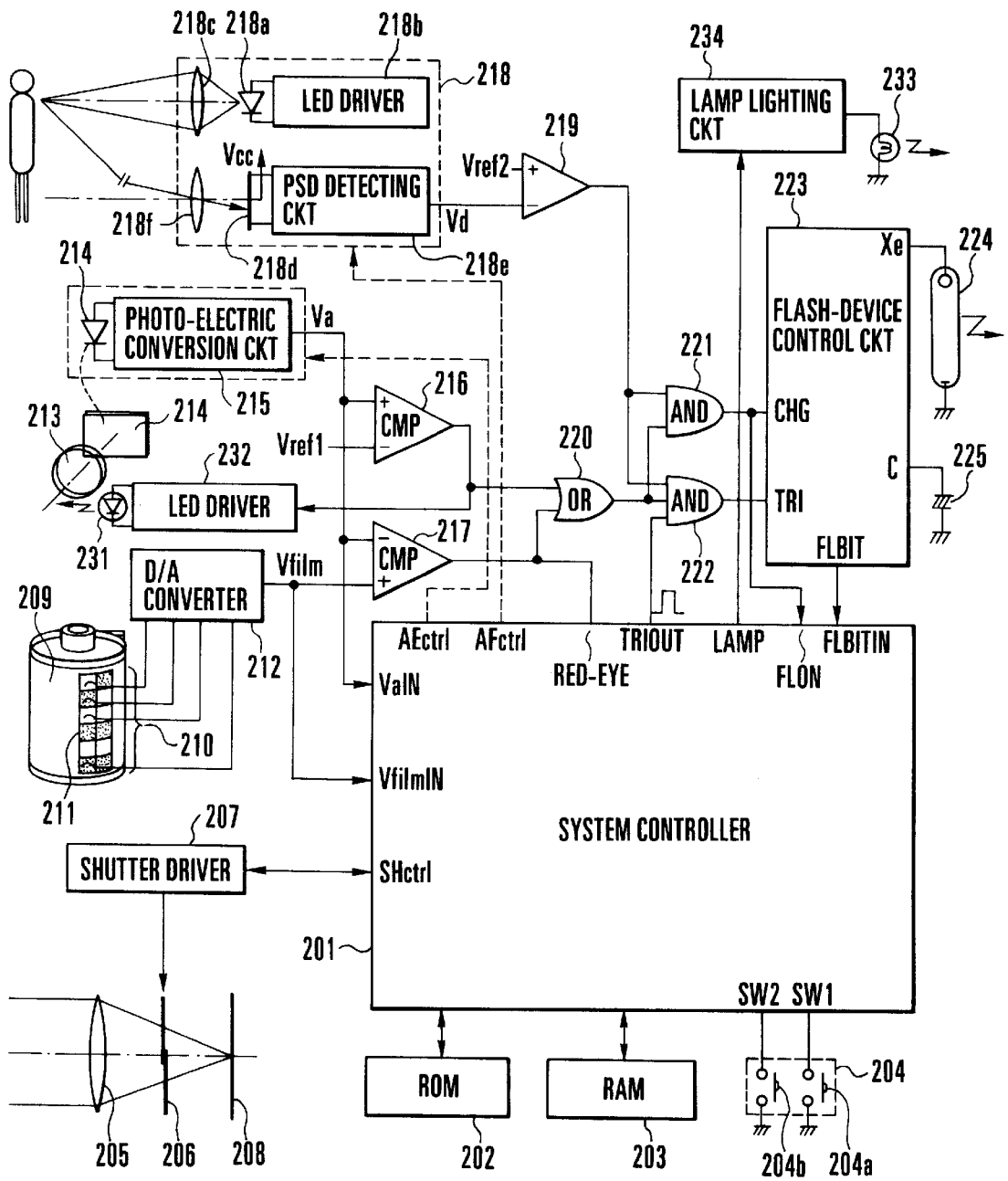
FIG. 14 is a block diagram showing in outline the arrangement of essential parts of a camera arranged as a fourth embodiment of the invention.
Figure 15:
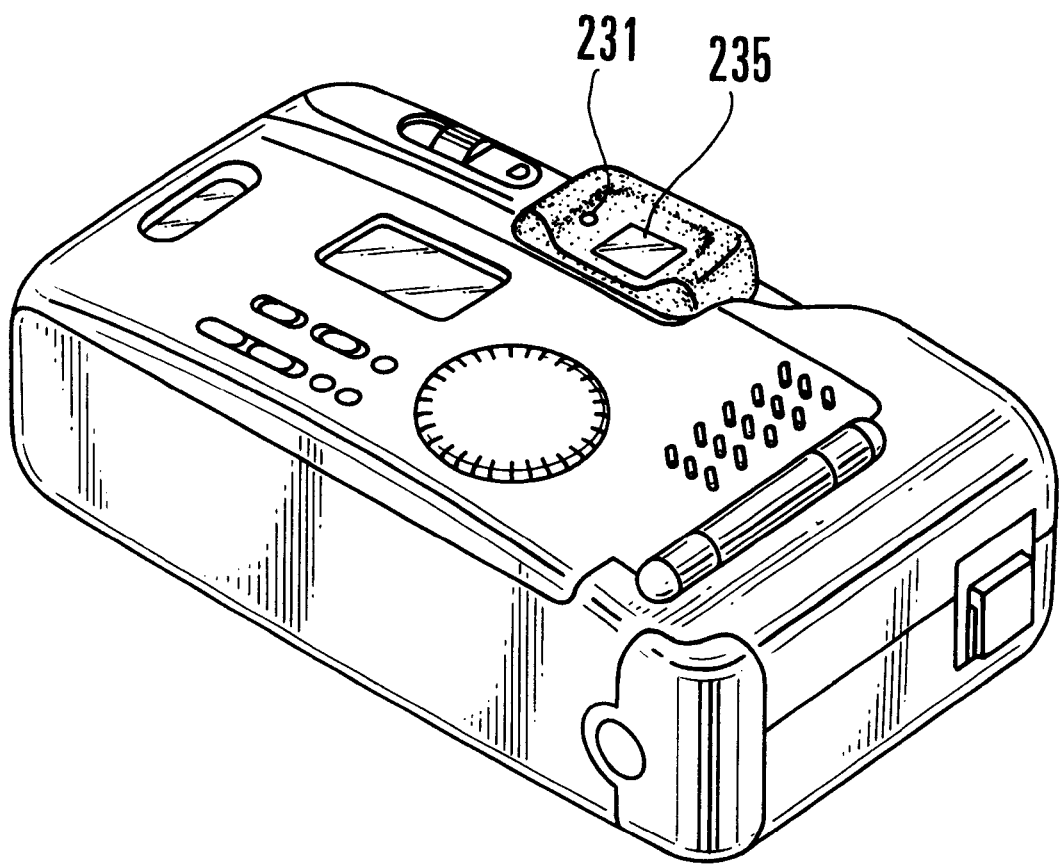
FIG. 15 is an oblique view showing the rear appearance of the camera which is the fourth embodiment.
Figure 16:
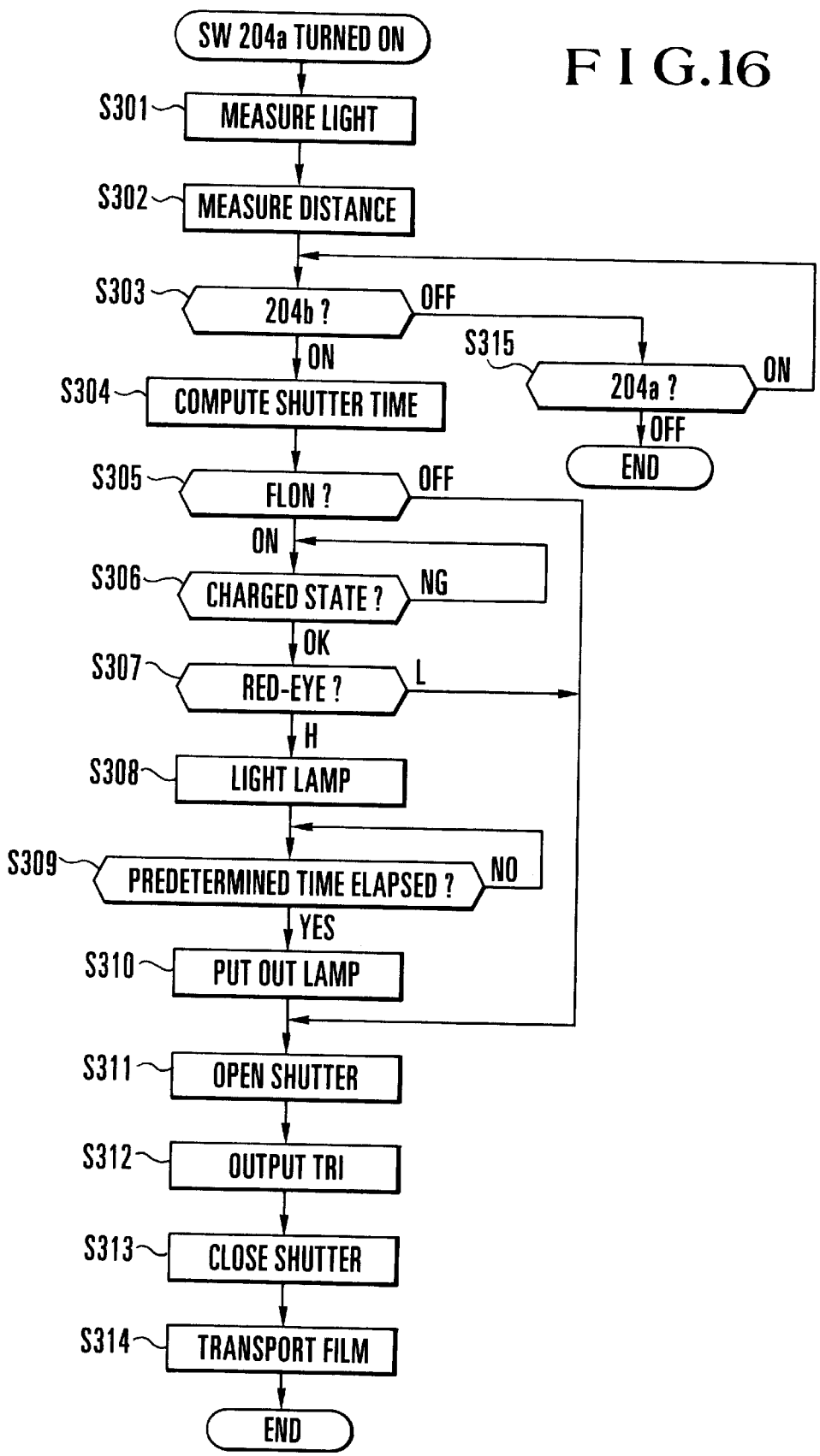
FIG. 16 is a flow chart showing the actions of the camera shown in FIGS. 14 and 15 and also the control actions of a system controller of the same camera.

FIGS. 14, 15 and 16 show a camera which is a fourth embodiment of the invention. The camera is arranged to have a red-eye preventing function and also an automatic shadow erasing function as well.

FIG. 14 shows in outline the arrangement of essential parts of the camera arranged as the fourth embodiment. In FIG. 14, the same component parts as those shown in FIG. 10 are indicated by the same reference numerals and, therefore, the details of them are omitted from the following description.

Referring to FIG. 14, a warning display LED 231 is disposed near to the viewfinder eyepiece. An LED driver 232 (or an LED driving circuit) is provided for driving the LED 231. The LED 231 is lighted when the input of the LED driver 232 is at a high level.

In FIG. 14, reference numeral 233 denotes a red-eye preventing lamp and reference numeral 234 a lamp lighting circuit. In FIG. 15, reference numeral 235 denotes the viewfinder eyepiece. The warning LED 231 is disposed near one side of the viewfinder eyepiece 235, so that a lighted state of the LED 231 can be confirmed when the camera user peeps into the viewfinder.

Actions of the camera of the fourth embodiment, i.e., actions of the system controller 201 are described below with reference to a flow chart shown in FIG. 16.

In taking a picture, the camera user directs the camera toward an object of shooting. The switch 204a turns on when the user first pushes the shutter release button 204 to the first stroke of operation on the button. The system controller 201 then begins to operate from a step S301 of FIG. 16.

Steps S301 to S306 are identical with the steps S201 to S206 of the second embodiment and are, therefore, omitted from description. At a step S307, a check is made for the level of the output of the comparator 217. The flow of operation comes to a step S308 if the level is high or to a step S311 if the level is low.

At the step S308, the red-eye preventing lamp 233 is caused to light up.

At a step S309, a check is made for the lapse of a sufficient period of time for contraction of the pupil of the object.

At a step S310, the red-eye preventing lamp 233 is put out.

A step S311 and steps subsequent to the step S311 are identical with those of the first embodiment and are, therefore, omitted from description.

As described above, the output of the comparator 217 is checked by the system controller 201 and the red-eye preventing lamp 233 is caused to light up only in a case where the flash device is to be automatically flashed with the object luminance found to be less than a predetermined luminance value. Further, the warning LED 231 is caused to light up according to the state of the output of the comparator 216.

The arrangement of the embodiment described above effectively prevents the camera user or a person whose picture is being taken from being misled to consider the camera to be out of order by any flashing action of the flash device performed despite of a bright environment. Further, in a case where the camera user intends to inhibit the use of the flash device, the camera user can be urged to use the flash device by informing the user that a shadow would appear because of a high degree of luminance of the object.

What is claimed is:

1. A camera, comprising:
   a) a first light receiving part for receiving a light flux from a light source positioned in a direction perpendicular to a photographic optical axis of the camera, wherein said first light receiving part receives light from the light source positioned in a zenith direction when the photographic optical axis is directed in a direction perpendicular to the zenith direction;
      said first light receiving part having a light receiving surface arranged to receive perpendicularly the light flux coming in the direction perpendicular to the photographic optical axis,
   b) a detecting circuit which decides intensity of the light flux coming from said light source and degree of inclination of the light source relative to a zenith direction, on the basis of an output of said first light receiving part;
   c) a light measuring circuit which receives mainly a light flux from a photographic optical axis to measure brightness of an object; and
   d) a processing circuit which judges a shading condition on the object on the basis of a result of decision by said detecting circuit.

2. A camera according to claim 1, wherein said photographing condition setting circuit is arranged to set a flash photography mode according to the result of the decision made by said detecting circuit.

3. A camera according to claim 1, wherein said detecting circuit is arranged to decide a degree of inclination of the light source relative to the zenith direction and intensity of the light flux coming from the light source from a center-of-gravity position of an image formed on said first light receiving element part and data corresponding to a ratio of a difference between a luminance value obtained at the center-of-gravity position and a luminance value obtained at a position located away from the center-of-gravity position.

4. A camera according to claim 1, wherein a light measuring axis of the first light receiving part is perpendicular to a light measuring axis of the light measuring circuit.

5. A camera according to claim 1, wherein said detecting circuit is arranged to decide a degree of inclination of the light source relative to the zenith direction and intensity of the light flux coming from the light source according to a state of distribution of luminance obtained on said first light receiving part.

6. A camera, comprising:
   a) a first light receiving part for receiving a light flux from a light source positioned in a direction perpendicular to a photographic optical axis of the camera wherein said first light receiving part receives light from the light source positioned in a zenith direction when the photographic optical axis is directed in a direction perpendicular to the zenith direction;
      said first light receiving part having a light receiving surface arranged to receive perpendicularly the light flux coming in the direction perpendicular to the photographic optical axis,
   b) a detecting circuit which decides intensity of the light flux coming from said light source and degree of inclination of the light source relative to a zenith direction on the basis of an output of said first light receiving part;
   c) a light measuring circuit which receives mainly a light flux from a photographic optical axis to measure brightness of an object; and
   d) a processing circuit which judges a shading condition on the object on the basis of a result of decision by said detecting circuit.

7. A camera, comprising:
   a) a first light receiving part for receiving light flux from a light source positioned in a direction perpendicular to a photographic optical axis of the camera, wherein said first light receiving part receives light from the light source positioned in a zenith direction when a photographic optical axis is directed perpendicular to the zenith direction;
      said first light receiving part having a light receiving surface arranged to receive perpendicularly the light flux coming in the direction perpendicular to the photographic optical axis,
   b) a detecting circuit which decides an intensity of the light flux coming from the light source and a degree of inclination of the light source relative to a zenith direction on the basis of an output of said first light receiving part;
   c) a light measuring circuit which receives a light flux from a photographic optical axis to measure brightness of an object; and
   d) a photographing condition setting circuit for setting a photographing condition according to a result of the decision made by said detecting circuit.

* * * * *

UNITED STATES PATENT AND TRADEMARK OFFICE
CERTIFICATE OF CORRECTION

PATENT NO. : 6,314,241 B1
DATED : November 6, 2001
INVENTOR(S) : Koichi Matsumura It is certified that error appears in the above-identified patent and that said Letters Patent is hereby corrected as shown below:

Column 1,
Line 24, delete "Re 29,599." and insert -- Re 29,599; --.

Column 4,
Line 28, delete "value .Vfilm" and insert -- value Vfilm --.

Column 12,
Line 23, delete "5204" and insert -- S204 --.

Signed and Sealed this

Third Day of September, 2002

*Attest:*

*Attesting Officer*

JAMES E. ROGAN
*Director of the United States Patent and Trademark Office*